Aug. 17, 1926.
M. W. LANDGREN
BATH BRUSH
Filed Nov. 13, 1924  2 Sheets-Sheet 1
1,596,361
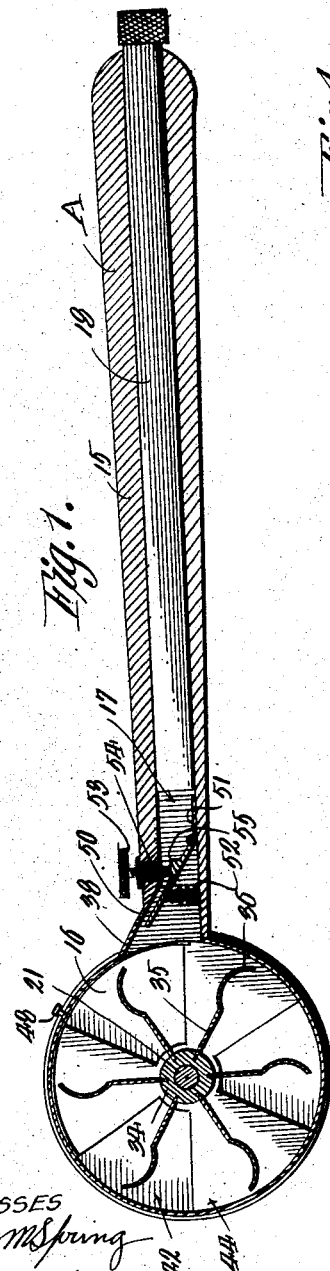
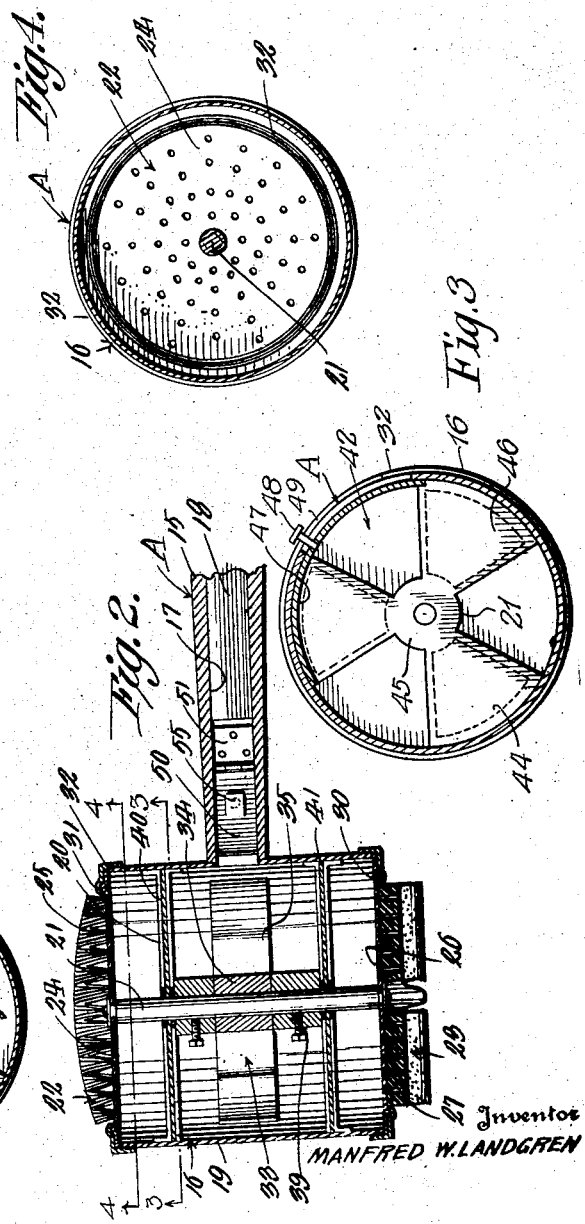
Inventor
MANFRED W. LANDGREN
By  Attorney Aug. 17, 1926.
M. W. LANDGREN
BATH BRUSH
Filed Nov. 13, 1924
1,596,361
2 Sheets-Sheet 2
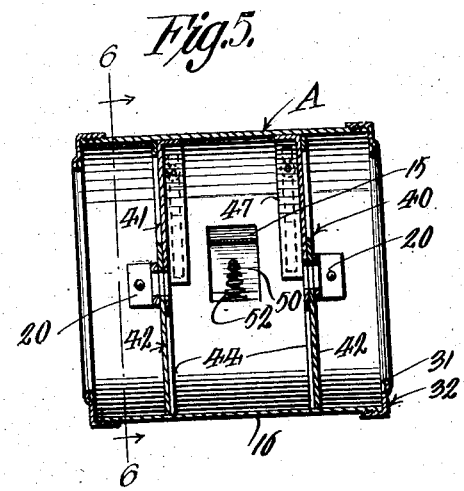
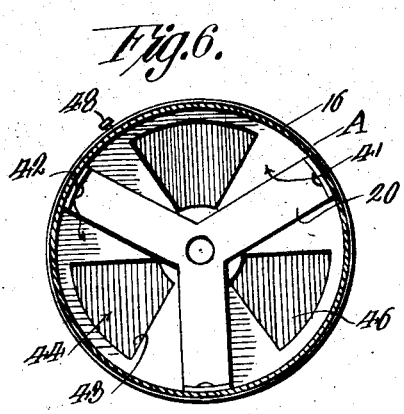
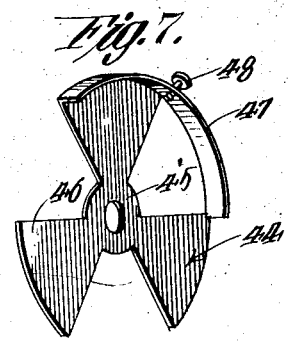
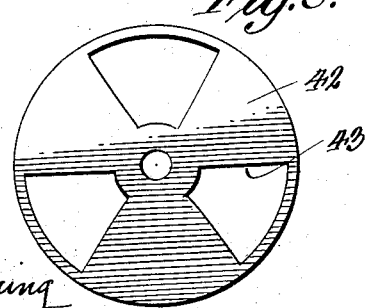
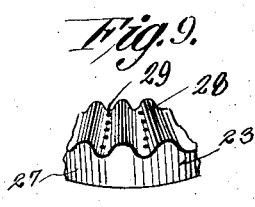
Inventor
MANFRED W. LANDGREN Patented Aug. 17, 1926.

1,596,361

UNITED STATES PATENT OFFICE.

MANFRED W. LANDGREN, OF ST. PAUL, MINNESOTA.

BATH BRUSH.

Application filed November 13, 1924. Serial No. 749,739.

This invention appertains to brushing and scrubbing and the primary object of this invention is to provide a combined brush and massaging implement and novel means for operating the brush and massaging implement.

Another object of the invention is the provision of a novel rotary brush adapted to be operated by water power and novel means for permitting the flow of water through the bristles of the brush.

A further object of the invention is to provide a novel rotary massaging implement having openings therethrough for permitting water to flow through the implement to engage the flesh being massaged.

A further object of the invention is the provision of a novel toilet apparatus embodying a brush head and a massaging implement secured respectively to the opposite ends of a rotatable shaft, to which is secured a water wheel, and novel means for directing the flow of water onto the wheel, whereby the brush and massaging implement will be simultaneously rotated.

A further object of the invention is to provide novel means for controlling the flow of water to the water wheel, so as to permit the shaft to be driven at different speeds.

A further object of the invention is to provide novel means for controlling the outlet of the water after the same has been used for driving the water wheel to the brush and massaging implement.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:—

Figure 1 is a longitudinal section through the improved device.

Figure 2 is a horizontal longitudinal section through the device.

Figure 3 is a transverse section through the head of the device taken on the line 3—3 of Figure 2 showing the means employed for controlling the flow of water to the brush bristles.

Figure 4 is a transverse section through the head taken on the line 4—4 of Figure 2 looking in the direction of the arrows showing the rotatable perforated plate supporting the brush bristles.

Figure 5 is a longitudinal section through the head with the water wheel and brush head and massaging implement removed.

Figure 6 is a transverse section through the head or casing taken on the line 6—6 of Figure 5 looking in the direction of the arrows showing the novel means for controlling the flow of water to the massaging implement.

Figure 7 is a perspective view of one of the movable valve plates employed for controlling the flow of water from the water wheel chamber to the brush bristles and the massaging implement.

Figure 8 is a plan view of the stationary valve plate used in conjunction with the movable valve plate for controlling the flow of water from the water wheel housing to the brush bristles and the massaging implement.

Figure 9 is a fragmentary detail perspective view of the massaging pad or implement.

Referring to the drawings in detail, wherein similar reference characters designate corresponding parts throughout the several views the letter A generally indicates the improved device, which comprises an elongated manipulating handle 15 having connected with one end thereof the head 16. This handle 15 is provided with a longitudinally extending bore 17 which communicates with the head 16 and a water conveying tube 18 is arranged in the bore. Any preferred type of rubber tubing is adapted to be connected with the end of the tube 18 in order to permit the device to be connected to a source of water supply. The handle 15 and the head 16 is preferably formed from aluminum or the like, but it is to be understood that the same can be made from any desired material. The head 16 extends transversely of the handle and comprises a cylindrical casing 19 having disposed therein in spaced relation to the terminals thereof supporting spiders 20, which rotatably carry the axially disposed shaft 21, The opposite terminals of the shaft 21 have secured thereto a brush head 22 and the massaging implement 23 and the brush head and the massaging implement extend outwardly from the opposite ends of the casing 19. The brush head 22 embodies a flat perforated disk 24 to which is secured in any desired way the brush bristles or tufts 25. The massaging implement 23 also includes a perforated disk 26 to which is secured a rubber massaging pad 27 which includes radially extending flesh engaging ribs 28. The pad 27 is provided with perforations 29 which communicates with the perforations in the disk 26.

Each of the disks 24 and 26 have formed thereon adjacent to the periphery thereof struck out annular ribs 30 and these ribs cooperate with flanges 31 formed on retaining rings 32, which are threaded into engagement with the end of the casing or body 19. By this construction it can be seen that the disks 24 and 26 are firmly held in place but are permitted to rotate with the shaft 21. Further the means just described prevents the seeping of water around the sides of the disks and the body or casing 19.

I prefer to use a water motor to operate the shaft 21 and in accordance with the invention a water wheel 33 is connected with the shaft 21. This wheel 33 embodies a hub 34 and radially extending blades 35 having the outer ends thereof shaped to provide buckets 36. This wheel is arranged directly in front of the handle 15 in order to permit the water flowing through the handle to impinge on the blades. The handle is provided with an inclined guide wall 38 for guiding the water stream off center, so as to insure the effectiveness of the motor. If desired spacing collars 39 can be placed on the shaft for holding the water wheel in place against movement laterally of the casing. Disposed on each side of the water wheel are control valves 40 and 41 which besides forming means for governing the flow of water to the brush bristles 25 and the massage pad 23 define a compartment within the casing in which operates the said water wheel. The valves 40 and 41 are of the same construction and therefore only one valve will be described in detail. Each valve 40 and 41 includes a stationary valve plate 42 provided at equidistant spaced points with substantially triangular shaped outlet openings 43. This plate is arranged against a spider 20 and can be secured thereto in any desired way. Disposed on the inner face of the stationary valve plate 42 is a movable valve plate 44 which embodies a hub 45 rotatably mounted on the shaft 21 and triangular extending flat blades 46. An arcuate flange 47 is connected with certain of the blades and this flange carries a manipulating pin 48 which is extended through a slot 49 in the casing. By moving the handle 48 the blades 46 can either be moved over or away from the openings 43 in the stationary valve plates in order to control the flow of water therethrough and it is obvious that by manipulating the said valve plates the amount of water flowing through the brush bristles and the massaging pad 27 can be controlled.

In order to control the flow of water to the water motor I arrange a valve plate 50 within the handle 15 adjacent to the water wheel and this valve plate 50 is hingedly connected in the bore of the handle to a suitable retaining plate 51, which can be bolted or otherwise secured in place. A relatively strong expansion spring 52 is normally employed for holding the valve plate 50 in a raised position in contact with the inclined guide wall 38, so as to normally prevent the flow of water into the water wheel compartment.

A thumb screw 53 is provided for moving the valve plate 50 against the tension of the spring 52 and this screw is extended through a suitable threaded sleeve 54 secured in the handle. A bearing shoulder 55 is formed on the valve plate and the thumb screw 53 is adapted to impinge against the same and it is obvious that by manipulating the screw that the plate can be moved varying distances away from the said guide wall 38.

When the valve plate is arranged in relatively close proximity to the guide wall 38 a very fine stream of water will be thrown against the blades 35, while if the valve plate is moved a relatively great distance from the said guide wall, a relatively large stream of water will be thrown against the said blades.

In use of the improved device, the same is connected with a water spigot or other water outlet by the use of a suitable rubber tube (not shown) and the flow of water to the wheel is controlled by the said valve plate, in order to regulate the speed of rotation of the brush. The speed of rotation of the water wheel also depends upon how fast the water flows from the casing 19, so the valves 44 are operated in conjunction with the valve plate 50. The brush can now be moved over the body and the brush will be found to be very effective in working up a lather or the like. The desired quantity of water can be supplied to the brush bristles by opening the movable valve plate 44 to the desired distance.

After the body has been cleaned, the lather can be rinsed by the use of the massaging implement, as by opening the valve plates 44 to its full extent, a relatively large quantity of water will be forced through the opening in the massaging pad onto the body.

When it is desired to use the pad as a massaging implement the water wheel is allowed to rotate to the desired speed and the pad is placed against the flesh and the usual beneficial results will be obtained.

From the foregoing description, it can be seen that I have provided a novel implement embodying a combined rotary brush and massaging pad, both of which can be operated by the flow of water through the same.

Changes as to details may be made without departing from the spirit or the scope of this invention, but:—

What I claim as new is:—

1. In a device of the class described, a hollow body, a manipulating handle secured to the body having a bore therethrough communicating with the body, an axially disposed shaft rotatably mounted within the body, and a propeller wheel secured to the shaft, a disk secured to the shaft, a work implement carried by the shaft, the disk having a struck out annular rib formed therein adjacent to the periphery thereof, and a retaining ring secured to the body having a flange engaging said rib.

2. In a device of the class described, a manipulating handle, a transversely extending cylindrical body carried by the inner end of the handle, an axially disposed shaft mounted within the body, the handle having a bore therethrough communicating with the body, a water wheel secured to the shaft directly in front of said bore, a valve arranged in the bore for controlling the flow of water through the bore to said wheel, a perforated disk plate secured to the shaft, brush bristles carried by said plate, the plate having a struck out annular rib formed therein adjacent to the periphery thereof and a retaining ring threaded on the body having a flange engaging said rib.

In testimony whereof I affix my signature.

MANFRED W. LANDGREN.